Dec. 15, 1936.  C. A. OTTO  2,064,175
AUTOMATIC CONTROL DEVICE
Filed Nov. 16, 1935

Inventor
Carl A. Otto
By
Attorneys

Patented Dec. 15, 1936

2,064,175

UNITED STATES PATENT OFFICE 2,064,175

AUTOMATIC CONTROL DEVICE

Carl A. Otto, Milwaukee, Wis., assignor to Johnson Service Company, Milwaukee, Wis., a corporation of Wisconsin Application November 16, 1935, Serial No. 50,194

14 Claims. (Cl. 236—1)

This invention relates to automatic devices for controlling atmospheric conditions such as temperature, and humidity; and for purpose of explanation will be described as embodied in a thermostat.

In certain installations, notably air conditioning systems convertible for operation under winter conditions and summer conditions, there is need for a simple automatic control device, having a single responsive element (for example a thermostat) which can be set to control in relatively reverse senses under winter conditions and under summer conditions, and whose control point may be appropriately set for each condition preferably as an incident to reversal.

The present invention meets that need and also provides simple and convenient adjustments which may be made independently for each condition of operation without affecting similar adjustments for the other condition of operation.

Generally stated, recourse is had to two leak ports, each with a controlling valve or lid. These two mechanisms are reversely arranged, so as to operate in reverse senses and means are provided to operate them selectively by a single responsive element (thermostat). A selector mechanism is provided to select the desired operative connection between the responsive element and one or the other of the leak port-valve mechanisms. This selector mechanism may also adjust the control point.

Two embodiments of the invention will now be described in connection with the accompanying drawing, in which,—

Figure 1:
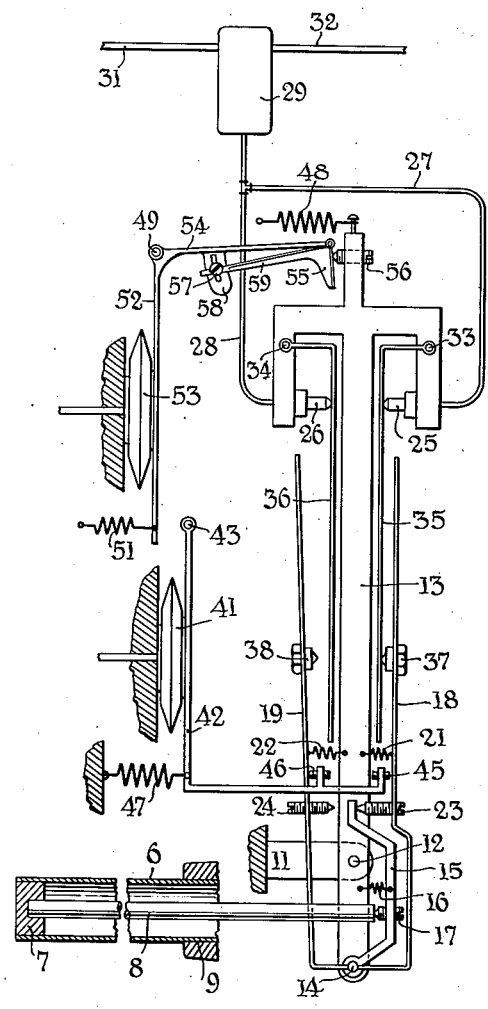

Fig. 1 is a diagrammatic elevation of a control device in which the selector mechanism and the means for changing the control point are independently operated.

Figure 2:
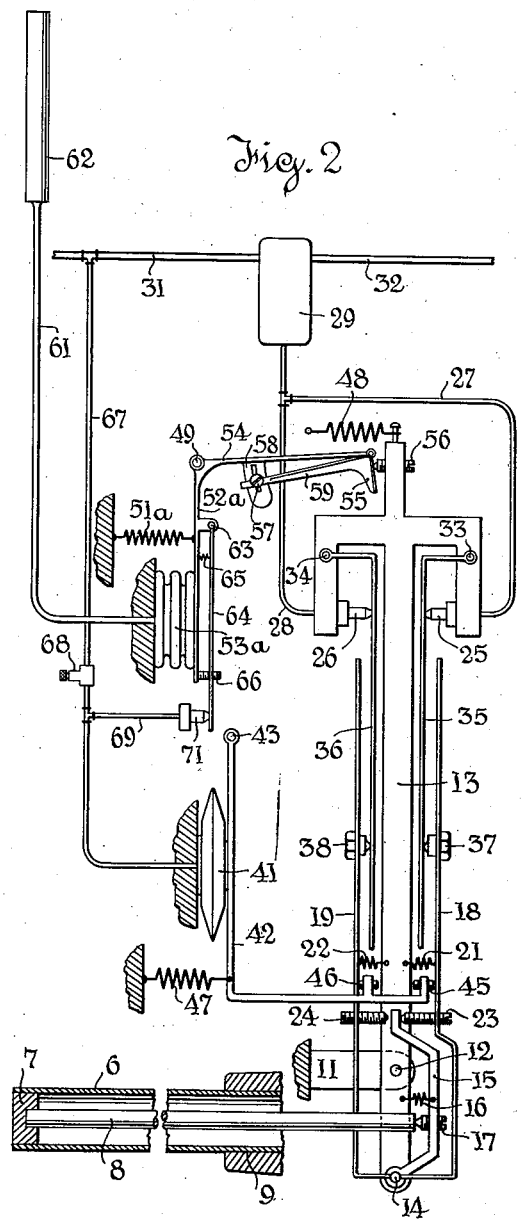

Fig. 2 is a similar view of an embodiment in which the selector mechanism and the means for changing the control point are actuated conjointly by a temperature responsive element.

Referring first to Fig. 1, the responsive element is indicated as a thermostat made up of two differentially expansible elements. There is a relatively expansible tube 6 which might conveniently be of brass. This has a closed end 7 against which there reacts the second element, namely, a relatively inexpansible rod 8 made, for example, of "Invar", an alloy having a negligible coefficient of thermal expansion. The tube 6 is fixedly supported, at 9 on the base of the instrument. A bracket 11 also supported on the base of the instrument carries fulcrumed to it at 12 a main supporting arm 13. Fulcrumed at 14 on the supporting arm is a lever 15 which is drawn toward the arm 13 by a coiled tension spring 16. Threaded in the arm 15 is a thrust screw 17 which reacts against the end of the rod 8. The arm 15 is swung on its pivot 14 by the differential between the expansion of the tube 6 and the rod 8. The screw 17 permits a primary adjustment or zeroing of the instrument.

Also pivoted at 14 on the lever 13 are two actuator levers 18 and 19, each drawn toward the lever 13 by a corresponding coiled tension spring 21 and 22. These levers are actuated selectively by the lever 15 through adjustable thrust screws, of which the screw 23 is threaded in the lever 18 and the screw 24 is threaded in the lever 19. At the upper end of the lever 13 are extensions whose form is clearly shown in the dawings, and these extensions carry opposed or reversely arranged leak ports 25 and 26. The ports 25 and 26 are connected through flexible tubes 27 and 28 respectively, with a leak port connection of a relay 29 which may be of any suitable form but is here assumed to be of the type shown in the patent to Otto, No. 1,500,260, July 8, 1924.

An air supply line 31 supplies motive pressure fluid, usually compressed air, to the relay, and a branch line 32 connects the relay with the actuating motor of some device which controls a temperature changing medium or humidity changing medium, depending on the system of control. Such devices are well known and it is deemed unnecessary to illustrate them in detail.

The relay 29 will be assumed to be of that type in which increased throttling of the leak port produces a rising pressure in the branch line 32, but relays acting in the reverse sense are known and their use is not excluded by any of the operative features of the invention here disclosed.

Pivoted at 33 and 34, near the upper end of the lever 13, are two pendant valve elements 35 and 36 which coact respectively with the leak ports 25 and 26, and each of which has a closing tendency under the action of gravity, so that unless they are forced in an opening direction the valve elements 35 and 36 function to close their respective leak ports 25 and 26. The valve elements 35 and 36 have longitudinal extensions which extend downward past the upper ends of the levers 18 and 19. Each of the levers 18 and 19 carries a thrust boss 37, 38, respectively, and each of these thrust bosses is adjustably clamped to its lever so that it may be shifted longitudinally on the lever 18 or 19, as the case may be. Longitudinal shifting of the boss 37 changes the leverage relation between the lever 18 and the valve 35, while longitudinal shifting of the boss 38 performs a similar function with reference to the parts 19 and 36. The function of this adjustment of the boss is to change the sensitivity of the control. In other words it changes the amount that leak port throttling is varied as the result of a given response of the responsive element. These two adjustments are wholly independent and either may be made without affecting the other.

A selector mechanism is provided to hold either the lever 18 or the lever 19 in an inactive position while permitting the other of the two levers to assume its active position. In Fig. 1 the lever 18 is in the active position and the lever 19 is in inactive position in which the valve member 36 holds the leak port 26 closed and thus renders it inactive. A pressure motor 41 operates the selector which takes the form of an arm 42 pivoted at 43 and carrying thrust screws 45 and 46. When the motor 41 is deflated a spring 47 draws the lever 42 toward the base and screw 46 engages bar 19 and forces it to inactive position. At such time the screw 45 moves far enough to clear the path of motion of lever 18. When the bellows 41 is distended the screw 45 displaces the lever 18 to inactive position and the screw 46 clears the lever 19 which moves to active position. In this way the thermostat is placed selectively in controlling relation to the leak ports 25 and 26, the uncontrolled leak port being closed by its valve at such time. In this way the controlling element is placed selectively in control of two leak port mechanisms which operate in reverse senses. Consequently when the leak port 25 is in action a rise of temperature tends to open the leak port 25 and reduce the pressure in the branch line 32. Conversely, if the leak port 26 is active rise of temperature tends to close the leak port 26 and thus increase the pressure in the branch line 32.

To change the control point of the instrument the lever 13 is displaced angularly on the axis 12, thus changing slightly the positions of the valve elements 35 and 36 with reference to the levers 18 and 19. To effect this adjustment a tension spring 48 draws the lever 13 to the left against an adjustable stop. A bell crank lever pivoted at 49 and normally positioned by a spring 51, has an arm 52 which may be shifted by a bellows motor 53. The other arm 54 of the bell crank carries pivoted to it an arm 55 which is the adjustable stop just mentioned and which reacts upon a thrust screw 56 mounted in the upper end of the lever 13. The inclination of the arm 55 with respect to the arm 54 is adjustable by means of a clamping screw 57 which clamps in a slot formed in a bracket 58 on arm 54 and retains arm 59 which is integral with the stop arm 55. Thus the arm 55 acts as a cam to shift the stop screw 56 when the motor 53 is alternately inflated and deflated. Adjustment of the screw 57 in the slot permits adjustment of the inclination of the arm 55 with reference to arm 54. In this way the amount the control point is changed may be determined.

In Fig. 1 the bellows 41 and 53 are indicated as having individual pressure connections which may be controlled in any suitable manner, not shown. In Fig. 2 there is illustrated one way of interrelating the bellows motors corresponding to 41 and 53, and controlling them both by a single responsive device, for example, a thermostat.

In Fig. 2 the parts 6 to 49 inclusive, and 54 to 59 inclusive, are identical with parts illustrated in Fig. 1 and consequently are given the same reference numerals. No further description of these parts is deemed necessary. Instead of the bellows motor 53 use is made of a bellows motor 53a connected by a tube 61 with a thermostatic bulb 62 containing an expansible fluid. The effect is to distend the bellows motor 53 on rise of temperature in the bulb 62. The arm 52a of the bell crank is functionally similar to the arm 52 and is drawn in by a spring 51a functionally similar to the spring 51. Pivoted to the arm 52a at 63 is a valve arm or lid 64 which is drawn toward the arm 52a by a coiled tension spring 65. Inward motion is limited by an adjustable stop screw 66. Adjustment of this determines the point in the motion of motor 53a at which the selector is shifted. A branch 67 from the supply line 31 leads through a throttling needle valve 68 to the bellows motor 41, and between the needle valve 68 and the bellows motor 41 is provided with a connection 69 which leads to a leak port 71. The valve arm 64 controls the leak port 71.

Upon rise of temperature at 62 the motor 53a is progressively distended and when stop screw 66 engages arm 52a the bar 64 will open the leak port 71 and cause the collapse of bellows motor 41. On a reverse change of temperature closure of the leak port 71 will cause distention of the bellows motor 41. It should be understood that the adjusted capacity of the needle valve 68 is less than the leak capacity of the port 71 when open.

The alternate collapse and distention of the bellows motor 53a in response to the temperature indications of the bulb 62 will move the arm 52a and consequently shift the inclined stop 55 relatively to the screw 56. The bulb 62 could be located at any desired point but I prefer to locate it out of doors in cases where the system is used to control a conditioner under both summer and winter conditions. In such case the thermostat 62 would become effective to change the adjustment within a range of outdoor temperature between the highest outdoor temperature at which heating is needed and a higher temperature at which the need for cooling commences. At a temperature within this range, determined by the adjustment of screw 66, the leak port 71 would function to operate the selector.

While I have described the invention as applied to a thermostatic device, I wish it expressly understood that the thermostat made up of the parts 6, 8, is intended to be typical. Various other thermostatic couples are known, many of which might be substituted. Furthermore, it is not vital to the broad aspects of the invention just what this temperature is. For example, a given thermostat will respond to dry bulb temperature if it is simply exposed to the atmosphere. It will respond to wet bulb temperature if it is given a wet envelope. It will respond to what is known as effective temperature if it is given a partial wet envelope. It can be made to respond to radiant heat by enclosing it in a blackened globe of copper, and while the use of these various known thermostatic devices is not of itself a feature of the invention, the mechanics of the structure herein disclosed are not dependent on the particular type of thermostat used. Furthermore elements which move in response to relative humidity of the atmosphere are known and might serve as the responsive element.

In other words the invention is concerned with a selective control including a reversible feature, and with features involving change of control point. It is not concerned with the specific form of the responsive element or the specific nature of the device controlled. Ordinarily this would be some means for controlling the supply of a temperature changing medium, but the invention can be usefully applied to other purposes. Furthermore, while I prefer to use the device in conjunction with a relay, because the relay accelerates the response, it is known that where such acceleration is unnecessary, leak ports can perform their controlling function without relays.

What is claimed is,—

1. The combination of a responsive element; two relatively reversely arranged leak valve mechanisms each adapted to perform a controlling function; means biasing each leak valve mechanism toward an inactive position; and means shiftable to connect the responsive element selectively in controlling relation with said leak valve mechanisms whereby the response of said element may actuate the selected leak valve mechanism.

2. The combination of a responsive element; two relatively reversely arranged leak valve mechanisms each adapted to perform a controlling function; means biasing each leak valve mechanism toward an inactive position; means shiftable to connect the responsive element selectively in controlling relation with said leak valve mechanisms whereby the response of said element may actuate the selected leak valve mechanism; and a single adjusting means modifying the relation of both leak valve mechanisms to the responsive element whereby the control point is adjusted.

3. The combination of a responsive element; two relatively reversely arranged leak valve mechanisms each adapted to perform a controlling function; means biasing each leak valve mechanism toward an inactive position; means shiftable to connect the responsive element selectively in controlling relation with said leak valve mechanisms whereby the response of said element may actuate the selected leak valve mechanism; a single adjusting means modifying the relation of both leak valve mechanisms to the responsive element whereby the control point is adjusted; and means for actuating said shiftable connecting means and said adjusting means in a definite relation to one another.

4. The combination of a responsive element; two relatively reversely arranged leak valve mechanisms each adapted to perform a controlling function; means biasing each leak valve mechanism toward an inactive position; means shiftable to connect the responsive element selectively in controlling relation with said leak valve mechanisms whereby the response of said element may actuate the selected leak valve mechanism; a single adjusting means modifying the relation of both leak valve mechanisms to the responsive element whereby the control point is adjusted; means for actuating said shiftable connecting means and said adjusting means in a definite relation to one another; and adjusting means for modifying the last-named relation.

5. The combination of a responsive element; two relatively reversely arranged leak valve mechanisms each adapted to perform a controlling function; means biasing each leak valve mechanism toward an inactive position; means shiftable to connect the responsive element selectively in controlling relation with said leak valve mechanisms whereby the response of said element may actuate the selected leak valve mechanism; and independent means for adjusting the degree of response of each leak valve mechanism to the action of the responsive element.

6. The combination of a responsive element; two relatively reversely arranged leak valve mechanisms each adapted to perform a controlling function; means biasing each leak valve mechanism toward an inactive position; means shiftable to connect the responsive element selectively in controlling relation with said leak valve mechanisms whereby the response of said element may actuate the selected leak valve mechanism; a single adjusting means modifying the relation of both leak valve mechanisms to the responsive element whereby the control point is adjusted; and independent means for adjusting the degree of response of each leak valve mechanism to the action of the responsive element.

7. The combination of a responsive element; two relatively reversely arranged leak valve mechanisms each adapted to perform a controlling function; means biasing each leak valve mechanism toward an inactive position; means shiftable to connect the responsive element selectively in controlling relation with said leak valve mechanisms whereby the response of said element may actuate the selected leak valve mechanism; a single adjusting means modifying the relation of both leak valve mechanisms to the responsive element whereby the control point is adjusted; means for actuating said shiftable connecting means and said adjusting means in a definite relation to one another; and independent means for adjusting the degree of response of each leak valve mechanism to the action of the responsive element.

8. The combination of a responsive element; two relatively reversely arranged leak valve mechanisms each adapted to perform a controlling function; means biasing each leak valve mechanism toward an inactive position; means shiftable to connect the responsive element selectively in controlling relation with said leak valve mechanisms whereby the response of said element may actuate the selected leak valve mechanism; a single adjusting means modifying the relation of both leak valve mechanisms to the responsive element whereby the control point is adjusted; means for actuating said shiftable connecting means and said adjusting means in a definite relation to one another; adjusting means for modifying the last-named relation; and independent means for adjusting the degree of response of each leak valve mechanism to the action of the responsive element.

9. The combination of a responsive element; two relatively reversely arranged leak valve mechanisms each adapted to perform a controlling function; means biasing each leak valve mechanism toward an inactive position; means shiftable to connect the responsive element selectively in controlling relation with said leak valve mechanisms whereby the response of said element may actuate the selected leak valve mechanism; and temperature responsive means effective through a limited range of temperature to adjust the relation of both leak valve mechanisms to said responsive element.

10. The combination of a responsive element; two relatively reversely arranged leak valve mechanisms each adapted to perform a controlling function; means biasing each leak valve mechanism toward an inactive position; means shiftable to connect the responsive element selectively in controlling relation with said leak valve mechanisms whereby the response of said element may actuate the selected leak valve mechanism; temperature responsive means effective through a limited range of temperature to adjust the relation of both leak valve mechanisms to said responsive element; and means effective at a definite temperature within said range to actuate said shiftable means.

11. The combination of a pair of leak valve mechanisms both connected to control a single device, and each biased in a closing direction; a responsive element; a member moved thereby; and means for selectively establishing regulatory actuating connections between said member and said leak valve mechanisms, the last-named means being so arranged that one leak valve mechanism is opened by motion of the member in one direction and the other leak valve mechanism is opened by motion of the member in the opposite direction.

12. The combination of a pair of leak valve mechanisms both connected to control a single device, and each biased in a closing direction; a responsive element; a member moved thereby; means for selectively establishing regulatory actuating connections between said member and said leak valve mechanisms, the last-named means being so arranged that one leak valve mechanism is opened by motion of the member in one direction and the other leak valve mechanism is opened by motion of the member in the opposite direction; and a single adjusting means for simultaneously adjusting the relation of both leak valve mechanisms, to the responsive element.

13. The combination of a pair of leak valve mechanisms both connected to control a single device, and each biased in a closing direction; a responsive element; a member moved thereby; means for selectively establishing regulatory actuating connections between said member and said leak valve mechanisms, the last-named means being so arranged that one leak valve mechanism is opened by motion of the member in one direction and the other leak valve mechanism is opened by motion of the member in the opposite direction; a single adjusting means for simultaneously adjusting the relation of both leak valve mechanisms, to the responsive element; and means for actuating said means for selectively establishing actuating connections, and said single adjusting means in a definite relation to one another.

14. The combination of a pair of leak valve mechanisms both connected to control a single device, and each biased in a closing direction; a responsive element; a member moved thereby; means for selectively establishing regulatory actuating connections between said member and said leak valve mechanisms, the last-named means being so arranged that one leak valve mechanism is opened by motion of the member in one direction and the other leak valve mechanism is opened by motion of the member in the opposite direction; and means associated with said actuating connections to modify the response of each leak valve mechanism to motion of said member.

CARL A. OTTO.